(12) United States Patent
Al Rawi et al.

(10) Patent No.: US 10,958,996 B2
(45) Date of Patent: Mar. 23, 2021

(54) TELECOMMUNICATIONS ACCESS NETWORK

(71) Applicant: British Telecommunications Public Limited Company, London (GB)

(72) Inventors: Anas Al Rawi, London (GB); Leslie Humphrey, London (GB); Trevor Morsman, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/087,739

(22) PCT Filed: Mar. 30, 2017

(86) PCT No.: PCT/EP2017/057603
§ 371 (c)(1),
(2) Date: Sep. 24, 2018

(87) PCT Pub. No.: WO2017/167915
PCT Pub. Date: Oct. 5, 2017

(65) Prior Publication Data
US 2019/0082244 A1    Mar. 14, 2019

(30) Foreign Application Priority Data
Mar. 31, 2016 (EP) .................................. 16163360

(51) Int. Cl.
*H04B 10/00* (2013.01)
*H04Q 11/00* (2006.01)
*H04L 12/423* (2006.01)

(52) U.S. Cl.
CPC ....... *H04Q 11/0071* (2013.01); *H04L 12/423* (2013.01); *H04Q 11/0067* (2013.01);
(Continued)

(58) Field of Classification Search
CPC .......... H04Q 11/0071; H04Q 11/0067; H04Q 2011/0045; H04Q 2011/0049;
(Continued)

(56) References Cited

U.S. PATENT DOCUMENTS 5,550,836 A * 8/1996 Albrecht ................. H04L 5/143
370/447
5,576,874 A * 11/1996 Czerwiec ............... H04J 3/1611
348/E7.094
(Continued)

FOREIGN PATENT DOCUMENTS

EP     2 209 325 A1 *  7/2010   ............. H04Q 11/04
EP     2209325            7/2010

OTHER PUBLICATIONS

International Preliminary Report on Patentability for corresponding International Application No. PCT/EP2017/057603 dated Oct. 2, 2018; 7 pages.
(Continued)

Primary Examiner — Mohammad R Sedighian
(74) Attorney, Agent, or Firm — Patterson Thuente Pedersen, P.A.

(57) ABSTRACT

A telecommunications access network comprises a primary aggregation point in the form of an exchange, a plurality of optic fiber to metallic pair interface aggregation points which may be in the form of Distribution Point Units (DPUs) each of which is connected to the primary aggregation point by a respective optical fiber connection, and a plurality of terminating devices which may be in the form of customer premises equipment (CPE) devices, each of which is connected to a respective one of the optic fiber to metallic pair interface aggregation points by a respective twisted metallic pair connection. The access network further includes a plurality of metallic, interface-interface connections between one or more pairs of the optic fiber to metallic
(Continued)

pair interface aggregation points. Each metallic, interface-interface connection preferably comprises three or more twisted metallic pairs of wires.

6 Claims, 6 Drawing Sheets

(52) U.S. Cl.
CPC ............... *H04Q 2011/0045* (2013.01); *H04Q 2011/0049* (2013.01); *H04Q 2011/0088* (2013.01); *H04Q 2011/0096* (2013.01)

(58) Field of Classification Search
CPC .... H04Q 2011/0088; H04Q 2011/0096; H04L 12/423; H04B 10/2575; H04B 10/25751; H04B 10/25753; H04B 10/25754; H04B 10/25756; H04B 10/25758; H04B 10/27; H04B 10/272; H04B 10/278; H04J 14/023; H04J 14/0232; H04J 14/0234; H04J 14/0235; H04J 14/0236; H04J 14/0238; H04J 14/0239; H04J 14/0242; H04J 14/0245; H04J 14/0246; H04J 14/0247; H04J 14/0249; H04J 14/025; H04J 14/0252; H04J 14/0278; H04J 14/0279; H04J 14/028
USPC .......................................................... 398/58
See application file for complete search history.

(56) References Cited

U.S. PATENT DOCUMENTS

| | | |
|---|---|---|
| 8,411,696 B1 | 4/2013 | Ko et al. |
| 8,601,289 B1* | 12/2013 | Smith ................. H04L 12/2885 713/300 |
| 10,069,617 B2 | 9/2018 | Al Rawi et al. |
| 10,097,236 B2 | 10/2018 | Al Rawi et al. |
| 10,305,716 B2 | 5/2019 | Humphrey et al. |
| 2008/0069017 A1* | 3/2008 | Clausen ................. H04L 5/0005 370/295 |
| 2011/0170424 A1 | 7/2011 | Saeid |
| 2013/0083725 A1* | 4/2013 | Mallya ................. H04W 12/08 370/328 |
| 2015/0117851 A1* | 4/2015 | Wellbrock ............ H04J 14/021 398/2 |
| 2016/0013864 A1* | 1/2016 | Rafel Porti ......... H04L 12/2861 398/58 |
| 2017/0244446 A1 | 8/2017 | Al Rawi et al. |
| 2019/0089408 A1 | 3/2019 | Humphrey et al. |

OTHER PUBLICATIONS

International Search Report and Written Opinion for corresponding International Application No. PCT/EP2017/057603 dated Jun. 20, 2017; 9 pages.

Cioffi et al.; "CuPON: The Copper Alternative to PON 100 Gb/s DSL Networks", 0163-6804/07 © 2007 IEEE Communications Magazine—Jun. 2007; pp. 132-139; 8 pages total.

Law et al.; Quantum Communications; "Evolution of Ethernet Standards in the IEEE 802.3 Working Group"; 0163-6804/13 © 2013 IEEE Communications Magazine—Aug. 2013; pp. 88-96; 9 pages total.

Moraes, et al.; "The Rate Maximization Problem in DSL with Mixed Spectrum and Signal Coordination"; 19$^{th}$ European Signal Processing Conference (EUSIPCO 2011); Barcelona, Spain, Aug. 29-Sep. 2, 2011; pp. 1583-1587; 5 pages total.

GB Search Report; GB Application No. GB1605480.1; dated Sep. 30, 2016; 6 pages.

* cited by examiner

TELECOMMUNICATIONS ACCESS NETWORK

CROSS-REFERENCE TO RELATED APPLICATION

The present application is a National Phase entry of PCT Application No. PCT/EP2017/057603, filed Mar. 30, 2017, which claims priority from EP Patent Application No. 16163360.7, filed Mar. 31, 2016 each of which is hereby fully incorporated herein by reference.

TECHNICAL FIELD

The present disclosure relates to a telecommunications access network and in particular to a hybrid optical fiber and twisted metallic pair connections network arranged in a largely dendritic manner.

BACKGROUND

Telecommunications access networks are evolving from a largely metallic twisted pair access network (generally referred to as a copper access network since the vast majority of such metallic twisted pair connections are formed from copper) towards hybrid optical fiber and twisted metallic pair connection networks. However, conventional telephony networks (as opposed to coaxial cable networks) still generally use an entirely dendritic arrangement.

Dendritic here refers to the arrangement of the access network whereby the access network continuously branches outwards away from a primary aggregation point in a downstream direction towards the edge of the access network. In particular, a primary aggregation point (such as a local exchange building) has several relatively large connections, which may be formed from a plurality of twisted metallic pairs (traditionally) or from optical fiber connections (more recently), each travelling to a respective intermediate aggregation point such as a street cabinet (which may also be referred to as a Primary Cross-connection Point or PCP). Each intermediate aggregation point then has several smaller connections, which may again be formed by fiber optic connections or multiple twisted metallic pair connections, each travelling to a respective further aggregation point such as a Distribution Point (DP). From each DP several smaller connections, which may even be just one active twisted metallic pair at this point, go to either a further, smaller aggregation point (e.g. another DP), or individual connections travel directly to a user's premises.

Note that significant variations on this arrangement are possible and not uncommon—for example some end user premises are connected "directly to the Exchange" which means that there is no cabinet or PCP between the Exchange and the end user's premises, although typically there will be a DP through which the line passes—note that for these cases it is not unreasonable to suppose that at some point a fiber optic connection may be made directly from the Exchange to such a DP; alternatively in such cases they may be converted to lines which are not directly connected to the Exchange by providing a cabinet (PCP) usually quite close to the exchange and re-connecting the lines to the cabinet instead of directly to the Exchange, with a short backhaul from the new cabinet to the Exchange. Additionally, an access network may include one or more Secondary Cross-connection points (SCPs) located between a PCP and a plurality of DPs—moreover, the connections between PCPs and SCPs may be optic fiber connections or metallic cable comprising a number of metallic pairs.

In any event however, at each aggregation point in a dendritic network, one can define an upstream and a downstream direction with increasing branching occurring in the downstream direction (i.e. in the direction away from the primary aggregation point such a local exchange) towards the user's premises at the other "end" (the remote end) of the access network and there is a single (relatively large—compared to the downstream connections) connection going in the upstream direction to a larger aggregation point. As mentioned above, this continuous downstream branching out and upstream aggregation is what is meant by an access network being entirely dendritic in nature.

As access networks evolve, network operators are installing optic fiber connections between each primary aggregation point (e.g. a local exchange) and its respectively connected intermediate aggregation points (e.g. PCPs, SCPs, DPs) to either replace or bolster the historic metallic connections. In this way, the fiber network is pushed closer to the "edge" (i.e. the user premises "remote end" of the access network). This push of optic fiber connections towards the edge of the access network can continue by installing further optic fiber connections between each intermediate aggregation point (e.g. a street cabinet or PCP) and each of its respective further aggregation points (e.g. SCPs and/or DPs). The legacy metallic cable connections are often left in place when an optic fiber connection is fitted; these legacy connections may be used as a backup-only connection to enable some (limited) connectivity to be maintained in the event of the respective fiber optic connection failing and/or in order to supply electrical power to downstream network equipment (e.g. network equipment located at a DP).

As a consequence of this push of fiber towards the edge of the access network, the bandwidth of the overall connections across the access network (i.e. between a user premises and the primary aggregation point (i.e. the local exchange) increases because the optic fiber connections can support very large bandwidths and additionally the bandwidth that can be provided over a copper connection increases dramatically as the length of the copper connection reduces (especially with the benefit of ever improving Digital Subscriber Line (DSL) protocols for use over these increasingly short copper connections).

At present, in the United Kingdom, many exchanges have fiber optic connections from the exchanges to the PCPs and then employ the VDSL2 standard over copper connections between the PCPs and end user premises. It is anticipated that a next stage of the evolution will be to install fiber optic connections additionally between the PCPs and the Distribution Points (DPs) and then to employ (a version of the) G.fast protocol (once this has been finalized) over the copper connections between the DPs and the user premises.

US 2013/0083725 describes an enterprise network that allows for a common policy infrastructure to provide access to information and services independent of a user's location, access method and client device being used, such that user policies can be configured at a central point of the network. The network operates to achieve this functionality by using an overlay network which operates independently of the topology of the underlying physical network which may include electrical, optical or wireless connections. The arrangement of these connections is irrelevant to the operation of the network but preferably they permit a tunnel such as an MPLS tunnel to be set up to forward packets from an access point to a core network node before applying a policy to such packets at the core node after ensuring that the policy is provided to the core node as soon as a device connects to a wired or wireless access point connected to the core node. The core node in an embodiment is illustrated as having a series of connections to another nodes some of which are connected to wireless access point nodes and others are connected to wired access point nodes. It is explicitly stated that the connections to such access points may be wired connections formed of optical fiber connections or metallic pair connections but the choice is irrelevant to the network of US 2013/0083725 and so there is no discussion of the benefits of using any particular configuration.

SUMMARY

According to a first aspect of the disclosure, there is provided a telecommunications access network comprising a primary aggregation point, a plurality of optic fiber to metallic pair interface aggregation points each of which is connected to the primary aggregation point by a respective optical fiber connection, and a plurality of terminating devices each of which is connected to a respective one of the optic fiber to metallic pair interface aggregation points by a respective twisted metallic pair connection, the access network being characterized by further comprising a plurality of metallic connections between at least some pairs of the optic fibre to metallic pair interface aggregation points. Note that the optic fiber connection between an optic fiber to metallic pair interface aggregation point and a primary aggregation point may not be a direct connection but could comprise multiple optical fiber connections—e.g. a first optic fiber leg between the primary aggregation point and the SCP and a second optic fiber leg between the SCP and the interface aggregation point.

This novel network design has a number of advantages and benefits compared to a conventional purely dendritic network. In particular, it provides resilience against optic fiber connection failures—and this resilience is better than that provided by keeping a (legacy) metallic cable connection in place to provide a parallel upstream connection because the length of such connections severely impacts the amount of data that can be carried over such connections; by contrast, with the "sideways" connections of the present disclosure, the metallic cable connections are relatively short and can thus provide a large bandwidth connection to a nearby aggregation point which can then provide a large bandwidth onward connection upstream via a large bandwidth fiber optic connection. Moreover, because the "sideways" connections (the connections between the optic fiber to metallic connection interface points) are formed from metallic (such as copper) connections, they are likely to react differently to any physical trauma adversely affecting an optic fiber connection—as a result it is possible that a physical trauma may cause an optic fiber connection to break without damaging a metallic sideways connection experiencing the same trauma.

The term "sideways" is employed because it indicates that the connections are not conventional dendritic connections which go either directly upstream (towards a primary aggregation point) or directly downstream (towards an end user premises), but rather go from one aggregation point to another aggregation point (which is neither a directly upstream nor directly downstream aggregation point (or end user termination point)). Most of the time these connections will be completely "sideways", in that they go from one aggregation point at a certain level in the hierarchy (going from primary aggregation point at the head of the hierarchy to end user premises at the bottom of the hierarchy) to another at the same level; however, in some cases the connections will be between two different aggregation points at somewhat different points in the hierarchy, such as from a DP to a cabinet (PCP) or to an SCP, because of the nature of the access network (e.g. a DP might be physically quite close to an SCP which is nonetheless on a different branch of the hierarchy so far as user data connections are concerned).

Note that most of the time user traffic (as distinct from signaling information) will not traverse over these sideways connections unless a fault has occurred. Thus, in the normal course of events, user traffic will flow from an end user premises via a CPE device in a directly upstream manner until it reaches the primary aggregation point, and vice versa for downstream traffic. Exceptions to this may occur where: 1) there has been a fault in an upstream connection—in such a case user traffic can be diverted through a sideways connection; and 2) where for some reason, traffic is flowing between two devices which are reachable via a sideways connection or connections without having to travel through the core network. There may also be additional reasons why user traffic flows through the sideways connections.

In addition to occasionally carrying user traffic, the sideways connections may additionally carry signaling information. Such signaling information can, for example, carry information about which frequencies wireless access points (e.g. 4G or 5G femto cell wireless access points) at user premises should use. Details on the sort of algorithms which can be used for this purpose are described, for example, in U.S. Patent Pub. No. US 2011/0170424.

Additionally, because the optic fiber to metallic pair interface aggregation points already contain metallic connection modems (typically DSL or DSL-like modems—whether employing VDSL or G.fast or both, or indeed some other similar protocol) the same device can be employed for communicating both over the downstream metallic pair connections to the terminating (end user) devices and over the sideways connections. Additionally, since the number of downstream metallic connections may vary from one interface aggregation point to the next, it is convenient to provision the modems for use in such interface aggregation points to be sufficiently large to be able to accommodate those interface aggregation points having the largest number of downstream metallic connections. That level of provisioning, however, means that in the majority of cases (in which the interface aggregation points have less than the maximum number of downstream metallic connections) the DSL-like modem will be over provisioned. This over-provisioning in such cases can then be exploited to provide the connection over a sideways metallic connection or connections (if at least one is present).

In some embodiments, the sideways connections comprise a plurality of twisted metallic pair connections. This enables various techniques to be employed to provide high bandwidth over the sideways connections. For example simple bonding can be employed, or bonding with vectoring. Additionally, more sophisticated techniques can be employed as described in greater detail below as well as in a co-filed application published as WO 2017/167938 A1. Similarly the techniques described in EP 15 162 109.1 (or applications claiming priority therefrom), EP 15 275 058.4 (or applications claiming priority therefrom), EP 15 275 057.6 (or applications claiming priority therefrom), or PCT/EP2015/072407 can also be advantageously employed to achieve greater bandwidths than can be achieved with conventional techniques such as simply vectoring different connections and bonding these together with just a single direct differential mode being employed for each twisted pair in the connection.

Further advantages of the use of sideways connections in accordance with the first aspect of the present disclosure are:

The sideways connections permit cooperation of wireless access points, especially of the femtocell type in which frequency re-use (as performed in cellular networks) is an important technique; moreover, the cooperation can be performed using the sideways connections thus not using valuable wireless bandwidth or power.

Information about the location of Radio Frequency Interference (RFI) interferers can be estimated and used to adopt a suitable mitigation strategy. For example if there is a strong RFI affecting one access point but which does not affect a neighboring access point even though the two neighboring access points have overlapping ranges of connectivity such that they should avoid using the same frequencies, then the RFI affected access point can use a frequency range which does not include the frequency of the RFI, while the neighboring access point can use a frequency range which does include the frequency of the RFI. Other more complex techniques can additionally be employed.

Persons skilled in the art from reading the above discussion of the sideways connections and the devices between which these sideways connections are formed will appreciate that it is preferred if at least one of the devices connected by a sideways connection is a Distribution point or a Secondary Cross-connection Point (SCP). The reason for this is that connections between Primary Cross-connection Points (i.e. street cabinets) would tend to be excessively long and therefore cumbersome to set up and less efficient at transmitting large bandwidths, thus the present disclosure is primarily directed at evolved access networks in which the interface between optical and metallic connections occurs at a point such as a DP or an SCP which is quite close to the end user premises and therefore equally quite close to another such DP or SCP at which an optical/metallic interface occurs. In some embodiments the optical/metallic interface includes a short-range optimized DSL modem (e.g. a VDSL or a G.fast modem) which is capable of exploiting the higher frequencies—e.g. above a few MHz right up to one or two hundred MHz—because it is intended for use over short metallic wire pair lines of less than 300 m length. This enables the sideways connections to operate at high frequencies and hence high bandwidths so as to support the connections being assisted in the event of a failure of an upstream optical link. It is also advantageous therefore if the sideways connections are also short in length—i.e. less than 300 m in length, for example. Persons skilled in the art will also understand that the sideways connections are intended to be deployed within an otherwise dendritic network in which there is only one optical connection emanating from each optic fiber to metallic pair interface aggregation point which connects the interface aggregation point to another upstream aggregation point in the network, whilst there are preferably multiple metallic pair connections emanating downstream towards terminating devices, the interface aggregation point including a multiple port short-range DSL modem (DSL here including g.fast and similar DMT based protocols) having a predetermined number of Analog Front End portions each providing a port to which a respective metallic pair may be connected to (or towards if passing through for example a directly downstream Distribution Point) a terminating device containing a cooperating DSL modem or to a metallic pair forming (a part of) a sideways connection, and wherein the multiple port modem is operable to establish a point-to-point connection over the respective connected metallic pair to a respective cooperating DSL modem located at a terminating device connected to the respective metallic pair. Moreover, the multiple port DSL modem can be operable to generate multiple cooperating signals over multiple pairs emanating from the multiple port modem which form (at least a part of) a sideways connection. Moreover, the modem is additionally preferably operable to perform vectoring of signals transmitted to multiple different terminating devices as well as of cooperating signals transmitted over a sideways connection emanating from the multiple port modem.

According to further aspect of the present disclosure, there is provided a method of constructing or modifying an access network including: providing a primary aggregation point and a plurality of secondary aggregation points (e.g. Secondary Cross-connection points or Distribution Points); fitting an optic fiber to metallic pair interface device, each such device including an optical termination unit and a short range Digital Subscriber Line modem having a plurality of ports for receiving metallic wire pairs, into each of a plurality of the secondary aggregation points, and connecting each of these to the primary aggregation point via the optical termination unit and a respective optical fiber connection, and connecting each of these to one or more terminating devices via a respective twisted metallic pair connection, the method being characterized by further connecting each of the secondary aggregation points containing an optic fiber to metallic pair interface device to another of the secondary aggregation points containing an optic fiber to metallic pair interface device via a plurality of metallic connections installed in spare ports for receiving metallic wire pairs within the respective short range DSL modems of the connected secondary aggregation points. Note that the optic fiber connection between an optic fiber to metallic pair interface aggregation point and a primary aggregation point may not be a direct connection but could comprise multiple optical fiber connections—e.g. a first optic fiber leg between the primary aggregation point and the SCP and a second optic fiber leg between the SCP and the interface aggregation point.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
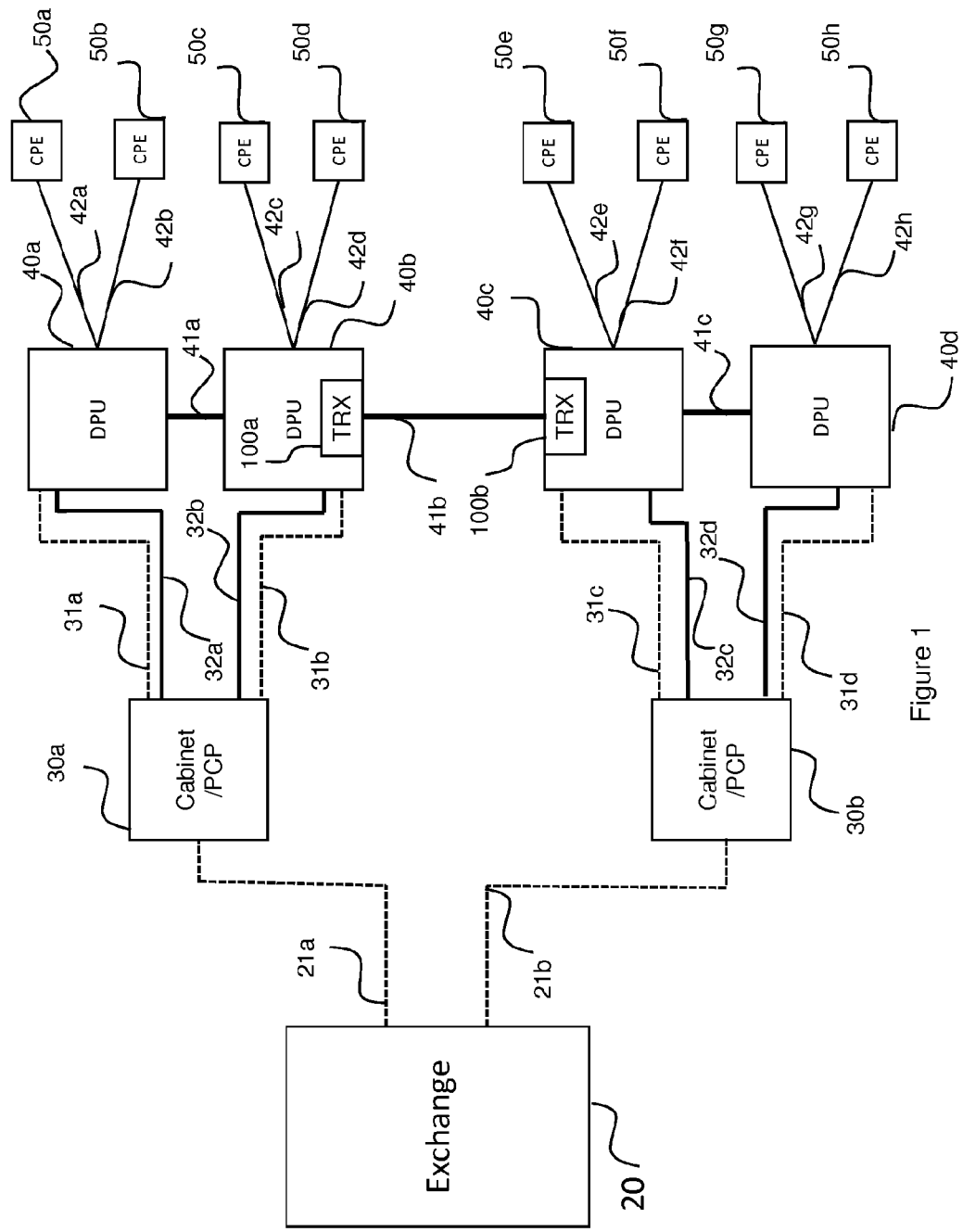
FIG. 1 is a schematic illustration of a part of a telecommunications access network including sideways connections formed from a bundle of pairs of wires connected between two transceivers.

Referring now to FIG. 1, an access network 10 is illustrated (schematically) comprising a primary aggregation point in the form of an Exchange building 20, two street cabinets or Primary Cross-connection Points (PCPs) 30a, 30b, four Distribution Point Units (DPUs) 40a-40d and eight Customer Premises Equipment (CPE) devices 50a-50h. This of course represents merely a part of a nationwide access network which would include many Exchange buildings interconnected by a high bandwidth core network. Additionally, the two-fold scaling up of devices located ever closer to the edge of the network (i.e. in the direction from Exchange 20 to CPE devices 50—hereinafter referred to as in the "downstream direction") is again arbitrary and for illustrative purposes only—in a typical network several (possibly twenty or more) PCPs are likely to be connected to each Exchange and up to fifty or so DPUs may be connected to each PCP, etc.

FIG. 1 also illustrates how the above-mentioned devices 20, 30, 40, 50 are all interconnected with one another in a hierarchical (dendritic) manner such that each of the upstream devices 20, 30, 40 is connected to two downstream devices 30, 40, 50 via an optical connection 21a, 21b, 31a-31d, and/or a copper connection 32a-32d, 42a-42h. In the present embodiment, the copper connections 32a-32d are legacy connections which have been left in place when the fiber optic connections 31a-31d were installed—the sole purpose of these connections 32a-32d is to enable electrical power to be provided to any of the DPUs 40a-40d in the event that there is not a more convenient power source available to any of the DPUs 40a-40d.

The Exchange 20 is connected to PCP 30a via an optical fiber connection 21a; additionally Exchange 20 is also connected to PCP 30b via a fiber connection 21b similar to fiber connection 21a. PCP 30a is connected to DPU 40a via a fiber connection 31a over which data is carried and via a copper connection 32a, which, in the present embodiment, is merely used to provide a possibility of supplying electrical power to DPU 40a (if there is no more convenient source of electrical power available to DPU 40a). In the present embodiment, copper connection 32a is a cable containing a bundle of 50 twisted copper pairs—i.e. enough to have been able to send at least one pair to each CPE device that could conceivably have been connected to the DPU 40, that is up to about 20-30 CPE devices or network termination points with normally one such termination point being required for each dwelling; as is normal in the telecommunications field, however, the cable in the present embodiment is over provisioned (e.g. to accommodate the possibility of houses being converted into flats etc.) by using a larger than necessary cable having 50 pairs.

Corresponding fiber 31b, 31c, 31d and copper 32b, 32c, 32d connections are in place for connecting PCP 30a to DPU 40b and for connecting PCP 30b to both DPU 40c and DPU 40d.

Finally, each DPU 40a, 40b, 40c, 40d is connected to multiple CPE devices 50a-50h via a corresponding copper connection 42a-42h only (e.g. DPU 40a is connected to CPEs 50a and 50b via respective copper connections 42a and 42b, DPU 40b is connected to CPEs 50c and 50d via respective copper connections 42c, 42d, etc.). In other words, in the present embodiment, there is no optical fiber connection between any of the DPUs and a corresponding connected CPE device. Note that these final copper connections 42a-42h typically comprise just one or possibly two pairs (in which case one of the pairs is generally a spare pair which is not connected electrically to the CPE). A primary traffic carrying path is thus provided between the Exchange 20 and each of the CPE devices. For example, the traffic carrying path between the Exchange 20 and CPE device 50g traverses between the Exchange 20 and CPE device 50g via optic fiber connection 21b, PCP 30b, optic fiber connection 31d, DPU 40d and copper connection 42g.

FIG. 1 also illustrates some additional sideways copper connections 41a, 41b, 41c which interconnect between DPUs 40a and 40b, between DPUs 40b and 40c and between DPUs 40c and 40d respectively. In the present embodiment, these connections 41a-41c are again copper cables which comprise 50 twisted copper pairs and thus are similar in this respect to copper connections 32a-32d (rather than say copper connections 42a-42h, which only comprise one or two twisted metallic pairs).

Finally, FIG. 1 also illustrates transceivers 100a and 100b located at both ends of copper connection 41b. It will be appreciated that there are similar transceivers located in all of the DPUs 40a-40d which, in the present embodiment, constitute the claimed optic fiber to metallic pair interface aggregation points since it is at these points that user traffic (travelling in the downstream direction) passes from an optical fiber connection 31a-31d to a twisted metallic pair connection 42a-42h. The transceivers 100a, 100b, in the present embodiment, operate to efficiently communicate data over a plurality of metallic pairs in a manner described in greater detail below. It will be appreciated that in practice, the transceivers 100 will in practice be constituted by the same transceivers which transmit and receive user data over the downstream copper connections 40a-42h as discussed above. However, for the purposes of the present specification they are described as separate transceivers for the sake of clarity only.

In the present embodiment, these sideways connections are used to carry signaling information to assist the CPE devices 50a-50h in coordinating which transmission frequencies they use for communicating wirelessly with user devices (not shown) as well as to provide backup backhaul connection routes in the event of a failure of one of the optical connections 31a-31d. These applications of the sideways connections are discussed in greater detail below with reference to FIGS. 5a and 5b after a discussion of the operation of the transceivers 100a, 100b in the present embodiment.

Figure 2:
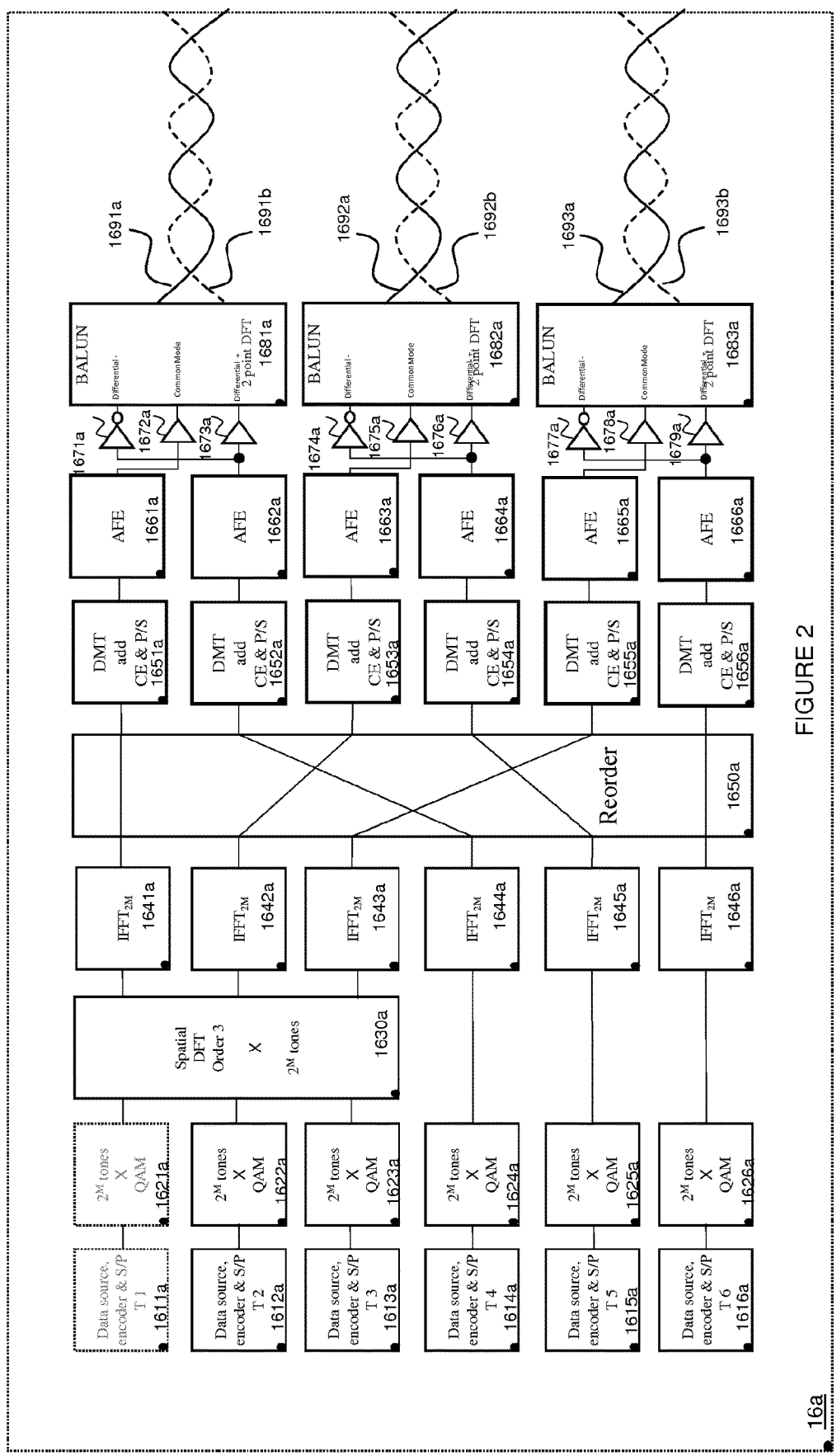
FIG. 2 is a schematic illustration of a transmitter portion of one of the transceivers of FIG. 1.
Figure 3:
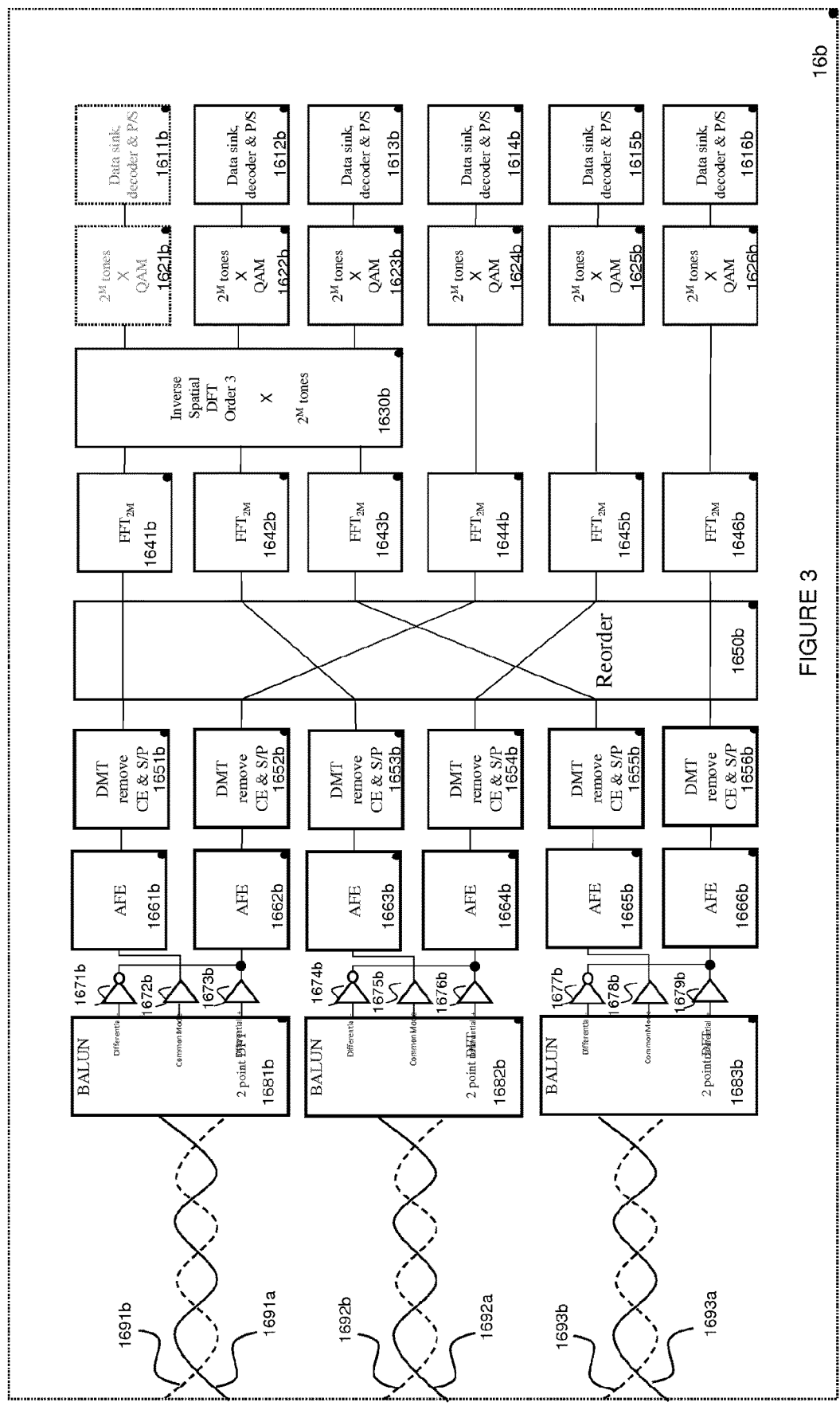
FIG. 3 is a schematic illustration of a receiver portion of one of the transceivers of FIG. 1.

Turning now therefore to FIG. 2, there is shown, in schematic form, a simplified explanatory transmitter portion 16a of one of the transceivers 100a, 100b. It is a simplified explanatory transmitter portion because, for the purposes of clarity and conciseness, the transmitter portion 16a is illustrated and described as being connected to a corresponding receiver portion 16b of another transceiver 100b, 100a via just 3 pairs 1691a-1691b, 1692a-1692b, and 1693a-1693b of copper wires; of course it will be understood that in practical embodiments it is desirable for the transceivers to be connected via many more pairs—e.g. via n pairs where n may conveniently be up to 50 or 100 as discussed above. Furthermore, it will be appreciated that the three illustrated pairs 1691a-1691b, 1692a-1692b, and 1693a-1693b of copper wires together form the copper connection 41b of FIG. 1. As can be seen, at the far left of the transmitter portion as depicted in FIG. 2, there are a series of six "sources of data" 1611a-1616a, the topmost 1611a of which is grayed out. Each of these blocks represents the start of a data path which ends at the corresponding data receiver block 1611b-1616b within a communicating receiver portion of a connected transceiver 100. The reason for there being just 6 sources of data is that there are just 3 pairs of wires in this explanatory embodiment. In general, the transceivers 100 are arranged to provide 2n data paths where n is the number of pairs, remembering that one of these paths is a dummy path as described below. The reason for the graying out (of both the topmost data source block 1611a and the topmost data receiver block 1611b) is that no actual data is to be transmitted across this data path because it corresponds to the common mode (of all 3 pairs) form of transmission which is generally so noisy that very little data (if any) can be reliably transmitted using this transmission mode (this common mode of all 3 pairs may hereinafter be referred to as the general-common-mode). In this schematic illustration, the transceivers are illustrated as being connected via 3 twisted metallic pairs. In practice the transceivers are preferably connected via a larger number of such pairs (e.g. up to 50 or 100 pairs); however, for the sake of clarity FIGS. 2 and 3 illustrate a much simpler case comprising only 3 pairs giving rise to 6 possible orthogonal channels, one of which is the common mode (of all pairs) which is the mode accessed via the top path and for this reasons the blocks 1611 and 1621 (in transmitter portion and receiver portion) are shown in grayed out form to indicate that no real data is actually transmitted over this path.

The sources of data are illustrated as being separate for illustrative purposes only. In fact, the data sources are likely in practice to all relate to a single common data source to be transmitted, but it is divided into 5 separate allocations of data to be passed respectively to blocks 1612a-1616a for transmission before being received at the corresponding respective data receivers 1612b-1616b before being re-amalgamated and then forwarded on to a higher layer in the system which is desirous of receiving the transmitted data streams. The topmost data source 1611a is supplied with dummy data. This can be selected in such a way as to serve a number of different useful purposes as will be appreciated by those skilled in the art. For example to achieve a good balance on the lines, or to minimize the peak to average ratio, or with a predetermined set of data to enable external noise impinging on the lines to be estimated, etc.

Additionally, the data source blocks 1611a-1616a include a serial to parallel conversion function as is well known in the art of Discrete Multi-Tone (DMT) transmission systems. Additionally at this stage other conventional functions such as adding Forward Error Correction (FEC), performing interleaving for non-FAST data paths, etc., is performed at this stage. Upon completion of all such processing to the data streams, the data is grouped into groups appropriate for the number of bits to be sent in each tone over each respective channel (the appropriate number for this purpose having been ascertained during a training procedure in a well-known manner, with the possibility of being updated during synchronization via a bit-swap procedure which is also well known and not relevant to the present disclosure).

The thus grouped groups of bits are then passed to respective modulator functions, in the present case Quadrature Amplitude Modulators (QAMs) 1621a-1626a in a conventional manner—namely each group of bits for transmission over a single tone is mapped by the QAM to a corresponding vector/complex number within a constellation of such vectors/complex numbers in the normal well-known manner.

The bottom-most three sets of vectors/complex numbers emanating from modulator functions 1624a to 1626a are then passed in a conventional manner to Inverse Fast Fourier Transform (IFFT) blocks 1644a-1646a which generate time domain samples of a continuous signal based on the input vectors/complex numbers passed to it in the well-known manner. These signals are ultimately to be transmitted, after some analog processing to convert the samples into a continuous analog signal amongst other things, over a respective metallic pair in conventional differential mode in the well-known conventional manner. These signals may henceforth be referred to as differential mode streams or channels.

The top-most three sets of vectors/complex numbers, however, are passed to a "Spatial Discrete Fourier Transform (DFT) of order 3" module 1630a (note that the spatial DFT module is of order 3 because there are three data paths input to it—there in turn being three such data paths because there are, in this illustrative example, just three pairs of wires interconnecting the transceivers 100—if there were n pairs there would be n data paths and the spatial DFT would be of order n). The function of the Spatial DFT module 1630a is to combine the vectors/complex numbers for each tone, in three different ways, to form three different combinations, in such a manner that the resulting combinations (after suitable conventional DSL processing by a conventional IFFT and analog processing, etc.) when applied to center taps of driving transformers, driving the (in this case) three wire pairs, creates (in this case) three signals which are carried over the three wire pairs in such a way that they are orthogonal both to themselves and to the conventional differential signals each of which is carried in a conventional differential mode over a respective one of the wire pairs. The particular way in which this is done is set out below mathematically, but in overview it can be described as applying a discrete Fourier transform of order 3 (being the number of pairs of wires—if being carried over n pairs of wires a discrete Fourier transform of order n would be required). As will be appreciated by persons skilled in the art this involves obtaining the $n^{th}$ root of 1 and multiplying each of the n input values by specified integer amounts of this root, where n is the number of input vectors/complex numbers (and also the number of pairs of wires connecting the transceivers 100). The signal paths after the signals have been combined to form the new combined signals may hereinafter be referred to as common mode transmission streams or channels to distinguish them from the differential mode streams or channels carrying single, un-combined data streams.

It will be apparent to persons skilled in the art, that the effect of the "combining" procedure performed by the spatial DFT module 1630a may be considered as splitting each of the input data signals into (in this case) three components. In the case of the first (dummy) data path each of these components has the same phase as one another, hence these components result in exploiting the overall common mode (the general-common-mode) where the signal must be measured by reference to a single common ground voltage such as Earth, and any extraneous noise will be easily coupled into this mode of transmission. On the other hand, both the second and third data signals are split into components with equal, non-zero phase distances to each other (+⅓ of a cycle phase difference between each component in the order output signal 1, output signal 2, output signal 3 (i.e. the signals going to IFFT modules 1641a, 1642a, 1643a respectively in FIG. 2) in the case of the second data signal, and −⅓ of a cycle in the case of the third data signal). This difference in phase of the components of the signals is akin to the difference in phase of the well-known three-phase alternating current power carrying signals. In order to recover the data signals at the receiver portion, these non-zero phase differences must be reversed—in doing this, the resulting changes to the phase differences of both the overall common mode signals, and any noise signals coupled onto the wires (which will tend to also have zero phase difference between them), as well as the other output signal(s) having (a) different non-zero phase difference between the different components, will in sum cancel each other out, thus leaving (in a perfect world) only the desired originally input data signal.

This procedure is carried out (naturally) independently for each tone (of which there may be several thousand) within each frame (of which there may be around 4000 per second).

The three resulting combinations are then passed to conventional IFFT modules 1641a-1643a for conventional IFFT processing similar to that performed by the bottommost IFFT modules 1644a-1646a discussed above. This effectively combines the values for each tone for a given combination to form time domain data samples of the 3 (or n where there are n wire pairs rather than 3 wire pairs) combination signals to be transmitted.

For the sake of ease of reference within this document, the parallel flows of data signals passing from left to right in FIG. 2 from data source units 1611a-1616a through corresponding QAM modulation units 1621a-1626a but before reaching the Spatial DFT module (for those flows that are processed by this module), as well as the flows in FIG. 3 to the right of the Inverse Spatial DFT module 1630b, are hereinafter referred to as data channels since from the perspective of the data emanating from the data source blocks 1611a-1616a there is a single respective channel from a respective data source block in the transmitter portion to a corresponding data sink block 1611a-1616b. However, for flows of data/digital/analog signals to the right of the Spatial DFT module 1630a in FIG. 2 and to the left of the Inverse Spatial DFT module 1630b in FIG. 3, the flows are referred to as transmission channels. Clearly, the bottom three data channels are directly linked to respective transmission channels, whereas the top three data channels in FIG. 2 are merged in a more complex manner to form three intermingled transmission channels which are only un-intermingled at the Inverse Spatial DFT module 1630b in FIG. 3.

In any event, the outputs from the IFFT modules 1641a-1646a are, in the present embodiment, passed to a reordering module 1650a (this is not strictly necessary as the necessary re-ordering could of course be done in a purely analog manner by connecting the outputs of the AFE modules described below to the correct attachment points of the various driving transformers/baluns, but it is convenient to minimize complex wiring issues which could cause unnecessary problems for what is a trivial digital operation which can be performed in the digital domain with minimal if any additional processing). The reordering module 1650a simply operates to ensure that signals intended to be used to excite the center tap of a driving transformer of a balun module exit the digital processing section adjacent corresponding signals intended to be used to excite the differential tap points of the respective driving transformer of the respective balun.

The outputs from the reorder module 1650a are then fed to respective conventional final digital DMT processing modules 1651a-1656a to add a cyclic extension and to parallel to serial (P/S) convert the signals for transmission. The outputs from the DMT modules 1651a-1656a are then passed to Analog Front End (AFE) units 1661a-1666a which perform digital to analog conversion of the signals output from the DMT modules. At this point the signals transfer from the digital to the analog domain. The analog signals output by the AFE units 1661a-1666a are then passed to respective baluns 1680a-1682a via inverting (1671a, 1674a, 1677a) and non-inverting (1672a, 1673a, 1675a, 1676a, 1678a, 1679a) amplifiers 1671a-1679a such that the first pair of wires 1691a and 1691b carry the signal output by IFFT 1644a in differential mode as well as, in common mode, the signal output by IFFT 1641a, the second pair of wires carry the signal output by IFFT 1645a in differential mode, as well as, in common mode, the signal output by IFFT 1542a and finally, the third pair of wires carry the signal output by IFFT 1646a in differential mode, as well as, in common mode, the signal output by IFFT 1543a. To excite the pairs in differential mode, a single signal is passed to a first one of the wires (e.g. 1691a) of the pair via an inverting amplifier (e.g. 1671a) and to the other of the wires (e.g. 1691b) via a non-inverting amplifier.

It will be apparent to persons skilled in the art that the processes performed above within the digital domain (i.e. prior to digital to analog conversion by the AFE units 1661a-1666a) may conveniently be performed by a suitably programmed digital signal processor. Consequently, the above described transmitter may conveniently be summarized as comprising: a processor adapted to generate a first set of transmission signals, each transmission signal in the first set of transmission signals being derived from a combination of at least a part of each data signal in the first subset of data signals, and a second set of transmission signals, each transmission signal in the second set of transmission signals being derived from a single respective one of the data signals in the second subset of data signals; and a transmitter adapted to transmit each of the transmission signals in the first set of transmission signals in a common mode over a respective one of the pairs of wires and to transmit each of the transmission signals in the second set of transmission signals over a respective one of the pairs of wires in a differential mode.

Turning now to FIG. 3, in order to recover the transmitted signals from the wires at the far end of the connection, a receiver portion 16b approximately reverses the steps performed by the transmitter portion 16a. Thus, signals arriving over the pairs of wires 1691-1693 are detected at respective baluns 1681b-1683b at which a differential signal is recovered by passing the signal from one (e.g. 1691a) of the wires through an inverting amplifier (e.g. 1671b) and the signal from the other one (e.g. 1691b) of the wires in each pair of wires (1691a,b; 1692a,b;1693a,b) through a non-inverting amplifier (e.g. 1672b) and then adding these two signals together, while the common mode signal carried commonly over each pair of wires (e.g. 1691a,b) is recovered by passing the output from a center tap of the transformer of the respective balun (e.g. 1681b) via a non-inverting amplifier (e.g. 1672b).

The signals output from the amplifiers 1671b-1676b are then passed to respective Analog Front End (AFE) units 1661b-1666b which perform sampling of the signals to obtain digital samples of the signals. These are then passed to respective DMT units 1651b-1656b. These perform conventional DMT pre-processing including removing the cyclic prefix (which was originally added by the corresponding DMT unit (1651a-1656a) in the transmitter portion 16a) and performing a serial to parallel conversion of the detected digital samples.

The signals output from the DMT units 1651b-1656b are then passed to a reordering module 1650b which simply undoes the reordering performed by the reorder module 1650a within the transmitter portion 16a. The reordered signals are then passed from the reorder module 1650b to a series of Fast Fourier Transform (FFT) modules 1641b-1646b which operate conventionally to convert the input time-domain signal samples from the time to the frequency domain, outputting frequency components. The output frequency components from the three topmost FFT modules 1641b-1643b are then passed to an inverse Spatial DFT module 1630b which undoes the combining performed by the corresponding Spatial DFT module 1630a in the transmitter portion 16a. The effect of this is to recover (estimates of) the vectors/complex numbers originally input to the Spatial DFT module 1630a in the transmitter 16a. The outputs of these are then provided to QAM demodulator units 1621b-1626b which recover the originally input data sets used by the corresponding QAM modulator units 1621a-1626a in the transmitter 16 by using the same constellation mappings as used by the modulator units 1621a-1626a in the transmitter portion.

The resulting sets of data are then passed to data sink units 1611b-1616b which perform inverse operations to those performed by the data source units 1611a-1616a in the transmitter 16a, such as applying any necessary forward error correction, etc., and then pass recovered/corrected data to a higher layer which wishes to receive the data. If the data is actually one single stream of data rather than 5 separate streams, then it may also be recombined in a suitable data aggregator (not shown) as discussed above with reference to the transmitter portion 16a.

Note that the topmost QAM demodulator unit 1621b and data sink unit 1611b are shown as grayed out in FIG. 3. This is because this is the dummy data path as discussed above. Depending on the use made of this path, it is quite likely that these two units could actually be omitted altogether since it is likely that there is no value in decoding this data.

The above described processes can be represented mathematically as follows:

Assume a transmission medium comprising three pairs of wires, $P_0$-$P_2$, where every pair is made of two metallic (e.g. copper) wires such that $$P_0 = (W_0 W_1)^T, P_1 = (W_2 W_3)^T, P_2 = (W_4 W_5)^T$$

In this case $W_0$ corresponds to wire 1691a, $W_1$ to wire 1691b, etc. through to $W_5$ corresponding to wire 1693b. The applied voltage signals to the wires are given by the following column vector:

$$x = (x_0 x_1 x_2 x_3 x_4 x_5)^T$$

These signals are to be processed to provide conventional differential mode signals for transmission over each pair of wires in the conventional differential manner as well as to provide some signals for transmission over common or phantom modes of excitation.

Referring again to FIG. 2, the signal processing performed by an embodiment comprises:

The data from 1611a-1616a are given by D, where $$D = (d_0 d_1 d_2 d_3 d_4 d_5)^T$$

these data, D, are first modulated, for example using M-QAM as illustrated in FIG. 2 at the QAM modulation units 1621a-1626a, at a given subcarrier/tone (n) to produce, for each tone, $$x = MOD[D] = MOD\begin{bmatrix} d_0 \\ d_1 \\ d_2 \\ d_3 \\ d_4 \\ d_5 \end{bmatrix} = \begin{pmatrix} x_0 \\ x_1 \\ x_2 \\ x_3 \\ x_4 \\ x_5 \end{pmatrix}$$

Note that 1611 is shown grayed out as mentioned above because it is the dummy path. This corresponds to data, $d_0$, which accordingly is the dummy data. As will be apparent from the equations below, the transformation of $d_0$ via the spatial discrete Fourier transform is such that this data is carried in the undesirable overall or general common mode referred to above. The two other orthogonal non-differential modes carry data $d_1$ and $d_2$ emanating from data source units 1612a and 1613a.

The modulated data x, is passed through the Spatial DFT unit 1630a (in fact only the top three signals $d_0$ to $d_3$ are altered at this stage) which can therefore be expressed mathematically thus:

$$\hat{x} = \begin{pmatrix} \widetilde{x_0} \\ \widetilde{x_1} \\ \widetilde{x_2} \\ \widetilde{x_3} \\ \widetilde{x_4} \\ \widetilde{x_5} \end{pmatrix} = \begin{pmatrix} \omega^0 & \omega^0 & \omega^0 & 0 & 0 & 0 \\ \omega^0 & \omega^1 & \omega^2 & 0 & 0 & 0 \\ \omega^0 & \omega^2 & \omega^1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{pmatrix} \begin{pmatrix} x_0 \\ x_1 \\ x_2 \\ x_3 \\ x_4 \\ x_5 \end{pmatrix},$$

where $$\omega = e^{\left(-\frac{j2\pi}{3}\right)}$$

or, more generally, $$\omega = e^{\left(\left(\frac{j2\pi}{n}\right)\right)}$$

where there are n pairs of wires. The above equation is for the case where n=3. It will be apparent to the skilled reader that the general equation may be given by:

$$\hat{x} = \begin{pmatrix} \widetilde{x_0} \\ \widetilde{x_1} \\ \widetilde{x_2} \\ \vdots \\ \vdots \\ \widetilde{x_n} \end{pmatrix} = M \begin{pmatrix} x_0 \\ x_1 \\ x_2 \\ \vdots \\ \vdots \\ x_n \end{pmatrix}$$

where M is a sparse 2n×2n matrix whose bottom left and top right quadrants are full of zeroes, whose bottom right quadrant is a diagonal matrix with 1's along the diagonal and 0's everywhere else and whose top left quadrant is filled with n rows and n columns and each element $e_{i,j}$ being given by $e_{i,j} = \omega^i \cdot \omega^j$ where $0 \le i \le (n-1)$ and $0 \le j \le (n-1)$ such that the top left element $e_{0,0} = \omega^0 = 1$ and $e_{m-1,n-1} = \omega^{(n-1)^2}$; also note that $\omega^{l \cdot n + m} = \omega^m$ where l and m are integers (i.e. in the case above where n=3, element $e_{2,2} \omega^4 = \omega^1$ as shown).

Next, $\hat{x}$ is passed though the IFFT units 1641a-1646a to produce time domain discrete signals:

$$\hat{X}_i[k] = \frac{1}{N} \sum_{n=0}^{N-1} \hat{x}_i[n] e^{j\frac{2\pi nk}{N}}.$$

Where:
1. $i$ is a channel index which is associated with the IFFT modules (i.e. $\hat{X}_i[k]$ are the time domain samples output by the $i^{th}$ IFFT unit except that the index i ranges from 0-5 rather than 1-6—i.e. if i=1 it refers to IFFT unit 1642*a*, if i=4 it refers to IFFT unit 1645*a*, etc.)
2. n is the frequency bin index and N is the total length of the FFT
3. k is the time sample index
4. [x] indicates x being a discrete parameter The time domain samples, $\hat{x}_i[k]$, are then passed through a reorder module 1650*a* to reorder the six (in this case) sets of time domain samples thus:

$$\hat{\mathbf{x}}[k] = \begin{pmatrix} \hat{\tilde{x}}_0[k] \\ \hat{\tilde{x}}_1[k] \\ \hat{\tilde{x}}_2[k] \\ \hat{\tilde{x}}_3[k] \\ \hat{\tilde{x}}_4[k] \\ \hat{\tilde{x}}_5[k] \end{pmatrix} = \begin{pmatrix} 1 & 0 & 0 & 0 & 0 & 0 \\ 0 & 0 & 0 & 1 & 0 & 0 \\ 0 & 1 & 0 & 0 & 0 & 0 \\ 0 & 0 & 0 & 0 & 1 & 0 \\ 0 & 0 & 1 & 0 & 0 & 0 \\ 0 & 0 & 0 & 0 & 0 & 1 \end{pmatrix} \begin{pmatrix} \hat{x}_0[k] \\ \hat{x}_1[k] \\ \hat{x}_2[k] \\ \hat{x}_3[k] \\ \hat{x}_4[k] \\ \hat{x}_5[k] \end{pmatrix} = \begin{pmatrix} \hat{x}_0[k] \\ \hat{x}_3[k] \\ \hat{x}_1[k] \\ \hat{x}_4[k] \\ \hat{x}_2[k] \\ \hat{x}_5[k] \end{pmatrix}$$

so that each common mode combined signal $\hat{x}_0$ to $\hat{x}_2$ is grouped with a respective non-combined signal $\hat{x}_3$ to $\hat{x}_5$ for application of pairs of combined and non-combined signals $\hat{x}_0$ and $\hat{x}_3$, $\hat{x}_1$ and $\hat{x}_4$, and $\hat{x}_2$ and $\hat{x}_5$ to respective wire pairs 1691, 1692 and 1693 via respective baluns 1681*a*, 1682*a*, 1683*a* as described below (it is of course immediately apparent how this could be extended to any number of pairs of wires to ensure that each common mode signal is grouped with a respective non-combined signal (i.e. one intended to be transmitted in a differential mode)). Prior to that however, the reordered signals are first passed through respective DMT modules 1651-1656 in which DMT symbols are created by adding a cyclic prefix and converting the discrete time sample values from a parallel to a serial arrangement ready for processing by the AFE units 1661-1666 which convert the discrete time sample values into a continuous signal ready for application to the wire pairs. Prior to applying the signals to the wire pairs 1691, 1692, 1693 via the respective baluns 1681, 1682, 1683, however, the differential signals are passed through inverting and non-inverting amplifiers in the manner already described above. It is interesting to note that the effect of the amplifiers and the balun providing a center point tap, configured as they are, is to effectively provide a second order spatial DFT unit, in which the common mode combined signal is formed into two components which are applied to both wires equally with no phase difference between them and the non-combined differential mode signal is formed into two components which have an equal, non-zero phase difference between them of half a cycle (i.e. they are anti-phase with one another); one component from each pair of signals are combined together and applied to a respective one of the wires of the respective wire pair.

As mentioned above, the above processes are reversed in the receiver such that, subject to the noise being insufficiently large to cause a detection error at the QAM demodulators 1621*b*-1626*b*, the transmitted data is recovered at the data sink units 1611*b*-1616*b*. As will be apparent to the skilled user, this involves, at the FFT units 1641*b*-1646*b* performing an FFT transformation which, after sampling $\hat{x}_i(t)$ to $\hat{x}_i[k]$, may be expressed as follows:

$$\hat{x}_i[n] = \sum_{n=0}^{N-1} \hat{x}_i[k] e^{-j\frac{2\pi nk}{N}}$$

Figure 4:
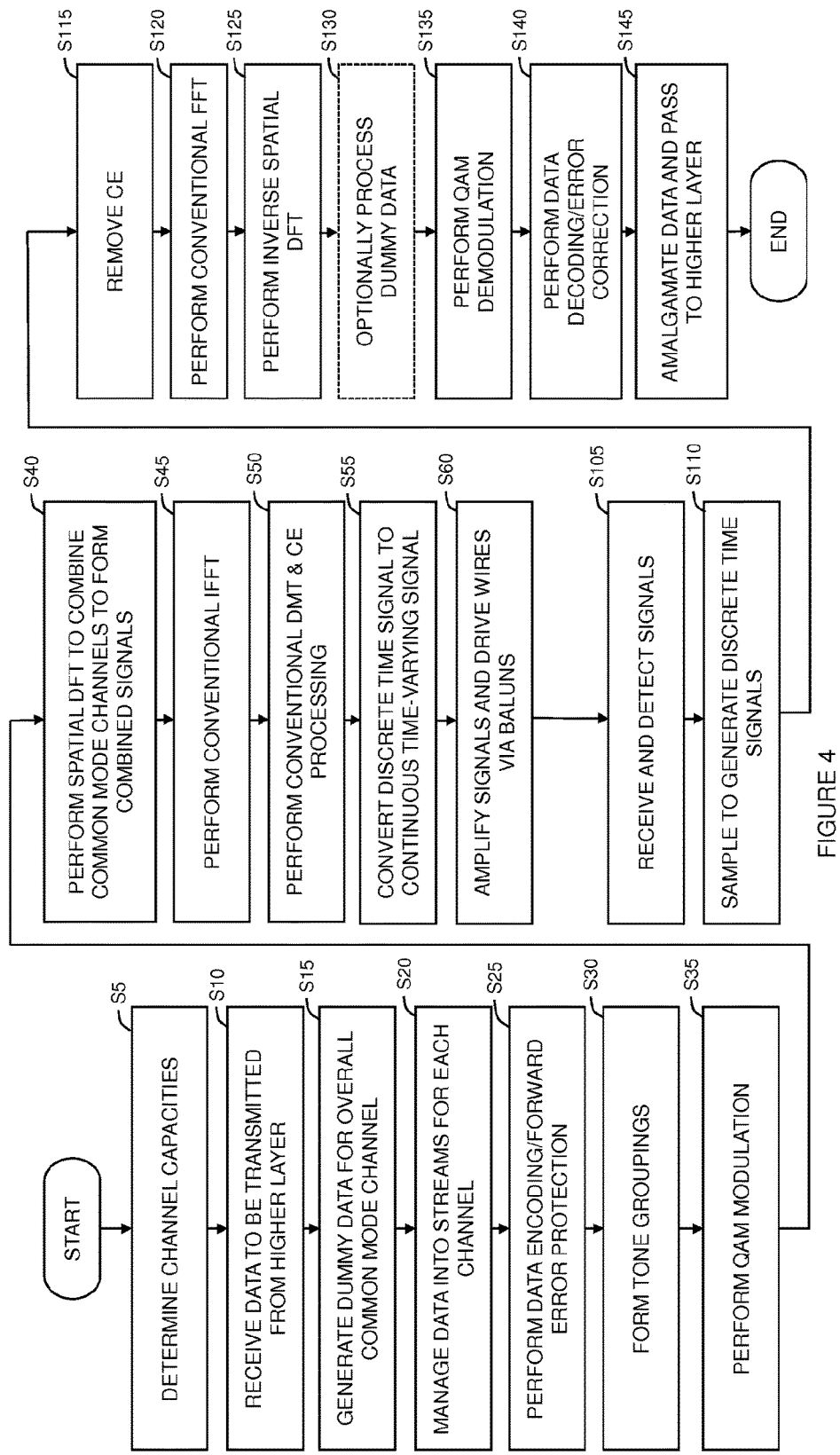
FIG. 4 is a flow diagram illustrating the method performed by the transmitter and receiver portions of FIGS. 2 and 3.

Turning now to FIG. 4, S5-S60 performed by the transmitter portion and S105-S145 performed by the receiver portion in transmitting and receiving signals are now described briefly in overview for completeness' sake.

Upon commencement of the method, the method proceeds to S5 in which the transmitter portion determines the channels capacities of the available channels. As explained above, in general there are up to 2n-1 usable channels, where n is the number of pairs of wires connected between the transmitter portion and the receiver portion. In the present case there are 3 pairs of wires connected between transmitter and receiver, and therefore 5 usable channels carrying non-dummy data. The normal method for determining the capacity of a single channel, single twisted pair connection can be employed to achieve this. For example, if the wire pair connection is of the order of 100 m-1000 m in length it may be appropriate to use a VDSL2 protocol in which case the normal method for assessing channel capacity during train up can be employed except it may advantageously be done simultaneously for each channel. If the connection is shorter than this it may be more appropriate to use a G.fast type protocol in which case the method employed in that protocol may be used to determine the channel capacity (again with the proviso that in the present case it is most conveniently performed simultaneously for all usable channels so that the effects of cross-talk are automatically present during training and channel estimation). In general, the channel capacity is determined as a normal part of the training process that is indeed the case in the present embodiment.

Having determined the capacities of the data channels in S5, performed as part of the training or synchronization procedure, the method proceeds to S10 in which data to be transmitted over the multi-pair connection is received by the transmitter portion from a higher layer on the device. Additionally, prior to S20, S15 of generating dummy data for transmission over the overall common channel is performed. In the present case a regularly repeating synchronization pattern of data is transmitted so that the receiver portion could be arranged to perform an estimation of external noise impinging on the system if desired.

The method then proceeds to S20 in which the data is arranged into data streams each for passing to a respective encoder unit 1611*a*-1616*a*. The method then proceeds to S25 in which the data associated with each stream of data is encoded—in particular, if some of the data is to be sent in an interleaved mode, then interleaving is performed, if some of the data is to have Forward Error Correction (FEC) applied to it, then this is added at this stage. If no interleaving and/or forward error correction is required (e.g. because physical layer retransmission is to be used instead), then nothing need actually be carried out at this stage.

Upon completion of S25, the method proceeds to S30 in which groups of data suitable for passing to a QAM modulation encoder function are formed from the received data (which may be received in a serial form and then buffered or received in batches in which case further buffering may not always be necessary). As part of the channel capacity determination process performed in S5, the number of bits which can be supported by each tone in each frame in each channel is determined and this information is used to group the bits to be transmitted into appropriately sized groups for the respective tone (over which that group of bits is to be transmitted).

Having thus encoded and grouped the bits, the method proceeds to S35 in which QAM modulation is performed—in particular, at this stage, the bits to be QAM encoded for a particular tone, for a particular frame and for a particular data stream/channel, are mapped to a constellation position which is represented as a complex number having a real and an imaginary part. The size of the constellation depends upon the number of bits which a particular tone is determined to be capable of carrying (i.e. during the channel capacity analysis phase).

Upon completion of S35, the method proceeds to S40 in which, for each tone (on a tone-by-tone basis), the complex numbers generated by the preceding QAM modulation process, for a given subset of the data streams/channels, are combined together by performing weighted summations, to form an output set of complex numbers within transmission streams/channels resulting from different combinations formed by applying different weightings (as described in greater detail above) to the data in the data streams/channels of a subset of the data streams/channels. As noted above, the number of output transmission streams of combined complex numbers is the same as the number of input data streams/channels (and also the number of input complex numbers is the same as the number of output complex numbers). The weightings used to form the different combinations are chosen such that the input signals can be recovered using a de-combining set of weightings in an orthogonal manner (i.e. an inverse operation can be performed which involves again forming a weighted combination in such a manner that each originally input signal is completely isolated from the other signals—assuming that there is no crosstalk or inter-symbol interference, etc.—such that no component of the other signals remains after the de-combining operations have been performed). As mentioned suitable weightings for achieving this are orthogonal codes such as Walsh-Hadamard codes for cases where the number of input and output data streams/channels is an exact power of two, or, more generally, a Discrete Fourier Transform code, again as discussed in greater detail above.

Upon completion of S40, the method proceeds to S45 in which conventional Inverse Fast Fourier Transformation is performed on each transmission stream in which the complex numbers corresponding to all of the tones for a particular transmission stream are combined together to form a corresponding set of output complex numbers which represent time domain values of a discrete signal corresponding to the input signal which is expressed as the frequency components of the same signal associated with the different tones.

Upon completion of S45, the method proceeds to S50 in which further conventional DMT processing is performed—in particular a Cyclic extension is added by repeating the final few signal samples of the set of signals for each transmission stream and adding them to the front of the signal in the well known manner.

Upon completion of S50, the method proceeds to S55 in which the discrete time domain signals of each transmission stream/channel are converted into continuous analog signals suitable for transmission over the wire pairs.

Upon completion of S55, the method proceeds to S60 in which the continuous analog signals of each transmission stream are amplified and then used to drive the wire pairs via a suitable drive transformer. As mentioned above, this is done via baluns which perform differential amplification of the differential mode transmission stream signals and straightforward amplification of the common mode stream signals (which are then applied to a center tap of the drive transformer).

FIG. 4 then illustrates how the signals are passed, between S60 and S105, over the multiple pairs of wires interface, from the transmitter portion to the receiver portion whereupon the S105 to S145 are performed by the receiver portion.

Thus at S105 the signals transmitted by the transmitter portion are received and detected at the receiver portion 16b. As described above, this involves performing inverting and non-inverting amplification on respective wires of each wire pair to recover the differential signals and a single amplification of a center tap signal at each wire pair to recover the common mode transmission signals.

Each of these signals is then processed at S110 by the AFE units 1661b-1666b in order to convert the signals into discrete time signals by sampling the continuous signals.

Then in S115 the cyclic prefix added in S50 is removed. Then in S120 conventional Fast Fourier Transform processing is performed to transform the discrete time domain signals into corresponding discrete frequency domain signals in the normal manner.

At S125 the common mode transmission stream signals are processed by the Inverse Spatial DFT module 1630b to recover the originally input data signals which were processed in S40.

Upon completion of S125 there is an optional S130 of processing the dummy data associated with the overall common transmission mode. as noted above this is likely to contain large amounts of noise, and no actual data to be passed to a higher layer is sent in this data stream, but the recovered data may nonetheless be processed at this stage for signal processing reasons—e.g. to estimate the external noise conditions impinging on the wire pairs.

Upon completion of S130 (or S125 if optional S130 is not being performed) the method proceeds to S135 in which the recovered data signals are QAM demodulated to recover the original data streams input to the QAM modulation A35 in the transmitter portion. Then at S140 any necessary further processing of the recovered data is performed (e.g. de-interleaving, processing forward error correction to remove the error protection overhead and correct any detected errors if necessary, etc.) and then finally the method proceeds to S145 in which the data is amalgamated if necessary before passing up to a higher layer for further processing of the transmitted data.

Alternative Embodiments

As mentioned above, the particular technique described above for optimizing communications over the sideways connections is merely one preferred example of how the connections should be operated. Alternative techniques could be employed such as, for example, simply performing bonded vectored DSL using all tones capable of supporting at least some minimum number of bits per frame (usually set to either at least 1 bit or at least 2 bits per tone per frame). Alternatively, any of the techniques described in EP 15 162 109.1 (or applications claiming priority therefrom), EP 15 275 058.4 (or applications claiming priority therefrom), EP 15 275 057.6 (or applications claiming priority therefrom), or PCT/EP2015/072407 could be used instead of (or in addition to where appropriate) such techniques.

Applications of the Sideways Connections

Figure 5A:
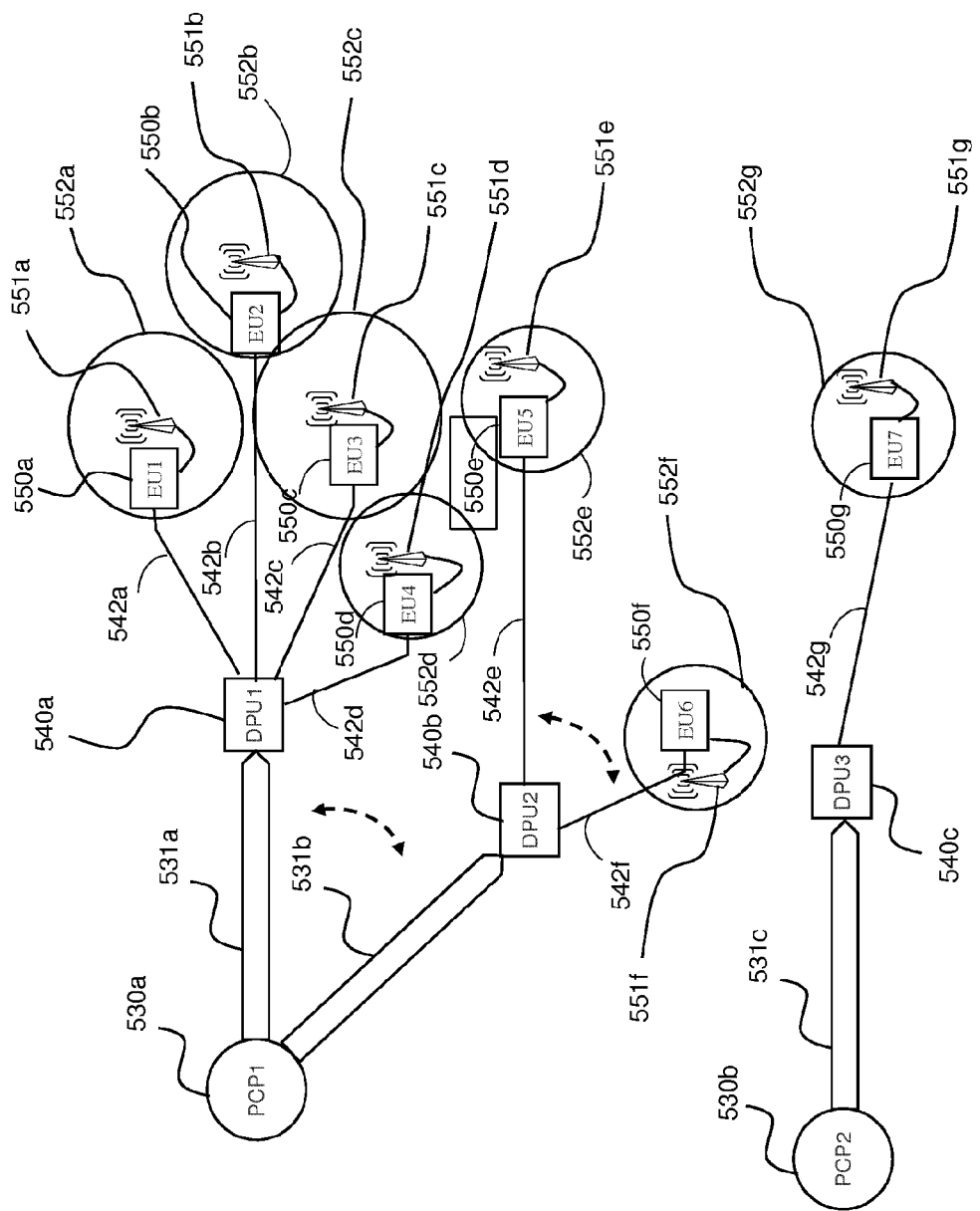
FIGS. 5a and 5b are schematic illustrations of access networks without (FIG. 5a) and with (FIG. 5b) sideways connections illustrating applications of the sideways connections of embodiments of the present disclosure.
Figure 5B:
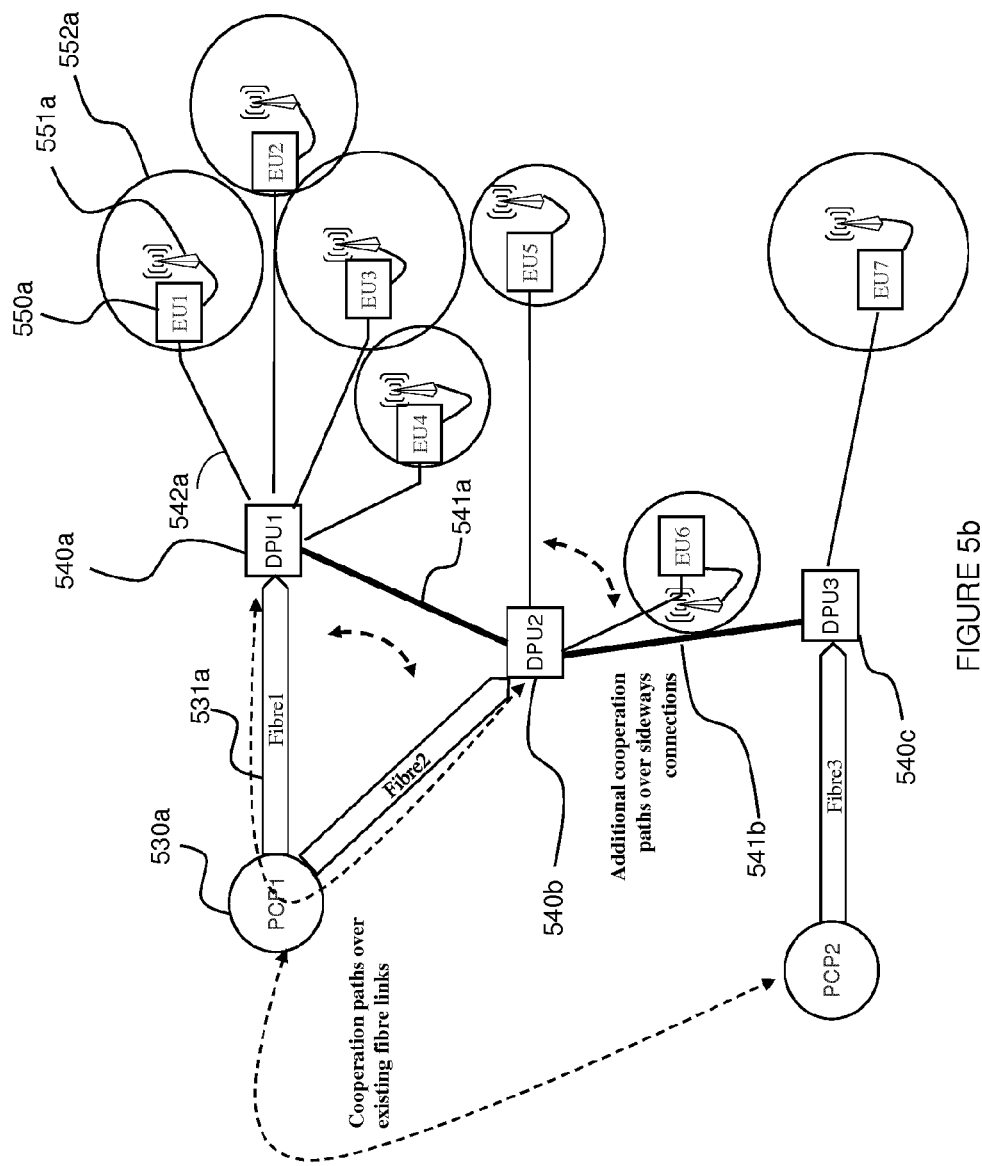

Turning now to FIGS. 5a and 5b, these show two similar parts of an access network both without (FIG. 5a) and with (FIG. 5b) sideways copper connections 541a and 541b connecting between a first DPU (DPU1) 540a and a second DPU (DPU2) 540b and between the second DPU (DPU2) 540b and a third DPU (DPU3) 540c respectively. Thus it will be apparent that FIG. 5a illustrates a prior art network whilst FIG. 5(b) illustrates an example embodiment of the present disclosure. In both cases the illustrated portion of the access network comprises two PCPs (PCP1 530a and PCP2 530b). PCP1 530a is connected to the first and second DPUs 540a, 540b via first 531a and second 531b fiber optic connections respectively, while PCP2 530b is connected to the third DPU (DPU3) 540c via third fiber optic connection 531c. DPU1 is connected to 4 end user devices (EU1, EU2, EU3, EU4) 550a-d via twisted copper pair connections 542a-d respectively, whilst DPU2 540b is connected to 2 end user devices (EU5 and EU6) 550e, 550f via twisted copper pair connections 542e, 543f and DPU3 540c is connected to just one end user device EU7 550g via a twisted copper pair connection 542g. Each end user device 550a-g is connected to a respective wireless access point 551a-g (which could be incorporated within the end user device) each of which has an area of coverage 552a-552g (hereinafter referred to as cells) schematically illustrated by the circle surrounding each wireless access point 551a-g.

In the present embodiment (e.g. as illustrated in FIG. 5b) each wireless access point is a femto-cell which operates using a wireless protocol in which a number of different frequencies can be employed and for which it is best to choose different frequencies for neighboring cells (note that a similar principle applies where the access points are wi-fi access points—according to one of the IEEE 802.11 standards—in which different channels within a single frequency range can be used, as can different frequency ranges completely in some cases). Additionally, in the present embodiment, each of the end user devices and the DPUs have an agent running which is operable to communicate with other corresponding agents running on neighboring or nearby devices. These communicate with each other using a distributed ad hoc network style approach as known in ad hoc network fields per se in order to agree a good frequency re-use strategy for deciding which wireless access points will use which frequencies in order to minimize interference from neighboring nodes. To achieve this in a bandwidth efficient manner, the agents running in the DPU attempt to minimize end user device to end user device and end user device to DPU communications and instead allow for more traffic between DPUs where the sideways connections 541a and 541b can be used without detracting from the bandwidth available for sending user traffic over the access network. To achieve this the DPU based agents act as masters with the end user agents acting as slaves doing whatever is instructed of them by the DPU agents which communicate amongst themselves to agree a suitable frequency allocation.

As part of the process for selecting which frequency (ranges) to use for each femto cell or wireless access point, the agents take into consideration any Radio Frequency Interference (RFI) which appears to be localized to just a few of the end user devices. Note that most modern end user devices include capability (whether standardized or proprietary) to measure the signal strength of received signals across the frequency spectrum which is usable by that device. By having the end user based agents report this to the DPU based agents they can between them determine an at least acceptable allocation of frequencies between the access points which takes into account both any localized interference and ensuring that frequency re-use is sufficiently dispersed that no two adjacent cells utilize frequencies that badly interfere with each other. As a part of this it is preferred if the access points can be controlled to broadcast in particular frequencies at the same time as other access points are listening in order to ascertain where end user devices (access points) are within interfering range of each other (e.g. where they have overlapping cells as depicted in FIGS. 5a and 5b between cell 552c and neighboring cells 552b and 552d). Additionally or alternatively, this can be ascertained by reporting to the DPU agents from time to time details of wireless devices (e.g. smart phones, tablets, etc.) visible to the access points—by identifying that the same wireless device is visible to two different access points at the same time, the DPU agents can infer that those access points are adjacent with one another and/or have overlapping cells.

Additionally, these agents also cooperate in a typical ad hoc fashion to set up re-routing if a part of a connection fails (e.g. if one of the fiber links 531a,b,c fails). Such re-routing may be done in a manner which is entirely transparent to the affected end user devices by providing a mechanism for monitoring the fiber optic connections at the respective DPUs. Thus each DPU includes an Optical Line Termination (OLT) unit which reports to the agent if its connection over the fiber link fails (or if it stops periodically reporting that the connection is operating, and fails to respond to requests from the DPU agent—which would be indicative of a failure in the OLT unit itself). When such an event occurs, the agent at the DPU is operable to re-route traffic that would have been passed to the OLT unit for transmission over the fiber connection, instead to the sideways connection transceiver (or transceiver portion) which transmits this over one or more sideways connections to neighboring DPU units whose respective agents multiplex the traffic received from the sideways connections with any traffic coming from the downstream end user devices for transmission upstream over the still functioning fiber optic connections. In addition, the DPU agents collect diagnostic information about the fault and can report these when requested to an upstream diagnostic tool connected to the access network somewhere (e.g. at an exchange building).

The invention claimed is:

1. A telecommunications access network comprising:
a primary aggregation point;
a plurality of optic fiber to metallic pair interface aggregation points, each of which is connected to the primary aggregation point by a respective optical fiber connection;
a plurality of terminating devices, each of which is connected to a respective one of the plurality of optic fiber to metallic pair interface aggregation points by a respective twisted metallic pair connection, the plurality of optic fiber to metallic pair interface aggregation points configured such that, in use, data passes from the respective optical fiber connection to the respective twisted metallic pair connection; and
a plurality of metallic, interface-interface connections between one or more pairs of the plurality of optic fiber to metallic pair interface aggregation points, wherein, in use, data passes from the respective optical fiber connection to one or more of the plurality of metallic, interface-interface connections.

2. The telecommunications access network according to claim 1, wherein each of the plurality of metallic, interface-interface connections comprises three or more twisted metallic pairs of wires.

3. The telecommunications access network according to claim 2, wherein each interface aggregation point connected to a metallic, interface-interface connection includes a transmitter device for transmitting a set of data signals over the three or more twisted metallic pairs of wires of the interface-interface connection, the set of data signals comprising a first subset of data signals and a second subset of data signals, each of the first and second subsets of data signals comprising at least two different data signals, the transmitter device comprising:

a processor adapted to generate a first set of transmission signals, each transmission signal in the first set of transmission signals being derived from a combination of at least a part of each data signal in the first subset of data signals, and a second set of transmission signals, each transmission signal in the second set of transmission signals being derived from a single respective one of the data signals in the second subset of data signals; and a transmitter adapted to transmit each of the transmission signals in the first set of transmission signals in a common mode over a respective one of the pairs of wires and to transmit each of the transmission signals in the second set of transmission signals over a respective one of the pairs of wires in a differential mode.

4. The telecommunications access network according to claim 1, wherein two or more of the terminating devices include a wireless access point, and wherein these terminating devices and optic fiber to metallic pair interface aggregation points include agents which communicate with each other to determine a frequency utilization plan, wherein at least some such communications take place over the interface-interface connections, and wherein the frequencies adopted for wireless communications by the wireless access points are selected in dependence upon the determined frequency utilization plan.

5. The telecommunications access network according to claim 4, wherein the agents are further operable to determine, based on measurements made by the wireless access points of received noise strengths, estimations of radio frequency interference generators, and to generate frequency utilization plans in dependence upon such estimations.

6. The telecommunications access network according to claim 1, wherein the optic fiber to metallic pair interface aggregation points include agents which are operable, in the event of a malfunction of one of the optical fiber connections, to reroute user traffic via an interface-interface connection.

* * * * *